US011580744B2

(12) United States Patent
Murata et al.

(10) Patent No.: US 11,580,744 B2
(45) Date of Patent: Feb. 14, 2023

(54) INFORMATION PROCESSING APPARATUS, INFORMATION PROCESSING METHOD, AND PROGRAM

(71) Applicant: Sony Interactive Entertainment Inc., Tokyo (JP)

(72) Inventors: Yuta Murata, Kanagawa (JP); Takanori Shimizu, Tokyo (JP); Ryuichi Hayashida, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 145 days.

(21) Appl. No.: 17/158,421

(22) Filed: Jan. 26, 2021

(65) Prior Publication Data
US 2021/0240995 A1 Aug. 5, 2021

(30) Foreign Application Priority Data
Feb. 5, 2020 (JP) .............................. JP2020-018167

(51) Int. Cl.
G06V 20/40 (2022.01)
G06V 10/75 (2022.01)

(52) U.S. Cl.
CPC ............ G06V 20/48 (2022.01); G06V 10/751 (2022.01)

(58) Field of Classification Search
CPC ...... G06V 20/48; G06V 10/751; G06V 10/75; G06V 10/757
See application file for complete search history.

(56) References Cited

U.S. PATENT DOCUMENTS

| 8,307,399 | B2 * | 11/2012 | Lee | H04N 21/8549 725/62 |
| 10,750,359 | B2 * | 8/2020 | Kim | H04N 21/8133 |
| 2003/0048359 | A1 * | 3/2003 | Fletcher | H04N 5/23248 348/E7.086 |
| 2018/0260669 | A1 | 9/2018 | Konishi | |
| 2019/0215683 | A1 * | 7/2019 | Kim | H04N 21/234318 |
| 2020/0175019 | A1 * | 6/2020 | Pichaimurthy | G10L 15/26 |
| 2022/0093034 | A1 * | 3/2022 | Noh | H04N 5/262 |

FOREIGN PATENT DOCUMENTS

| EP | 3373197 A1 * | 9/2018 | ......... G06K 9/00208 |
| JP | 2017059121 A | 3/2017 | |
| JP | 2017211791 A | 11/2017 | |
| JP | 2018151748 A | 9/2018 | |

OTHER PUBLICATIONS

Notice of Reasons for Refusal for corresponding JP Application No. 2020-018167, 6 pages, dated Jan. 27, 2022.
Notice of Reasons for Refusal for corresponding JP Application No. 2020-018167, 8 pages, dated Jul. 14, 2022.

* cited by examiner

Primary Examiner — Shaghayegh Azima
(74) Attorney, Agent, or Firm — Matthew B. Dernier, Esq.

(57) ABSTRACT

An information processing apparatus includes a frame image acquisition section adapted to acquire a plurality of consecutive frame images included in a moving image displayed on a screen, and a matching process section adapted to perform, for each of the plurality of acquired frame images, a matching process of detecting an area that matches a template image representing appearance of a display element to be detected. An area in which the display element is being displayed on the screen is identified on a basis of a result of performing the matching process on the plurality of frame images.

4 Claims, 4 Drawing Sheets

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2020-18167 filed Feb. 5, 2020, the entire contents of which are incorporated herein by reference.

BACKGROUND

The present disclosure relates to an information processing apparatus, an information processing method, and a program for analyzing a display image being displayed on a screen.

There is an occasional desire to analyze a display image to be displayed on a screen of a display apparatus and detect a specific display element. For example, when one desires to automatically perform an operation in an application program instead of a user, it is necessary to detect a display element such as specific button or icon to be operated by the user among display elements to be displayed on the screen by the application programs and to cause some kinds of events (e.g., click operation) to occur at a position where the display element is displayed.

SUMMARY

Under a circumstance described above, if the display image being displayed on the screen remains unchanged, it is only sufficient to simply identify an area that matches the intended display element in the display image. However, in a case where the display image being displayed on the screen changes with time, for example, in a case where the icon to be desired to be detected flashes, it may be difficult to detect the intended display element by a simple matching process.

The present disclosure has been devised in light of the foregoing, and it is desirable to provide an information processing apparatus, an information processing method, and a program capable of analyzing a moving image being displayed on the screen and detecting, with relatively high accuracy, an intended display element.

According to an embodiment of the present disclosure, there is provided an information processing apparatus including a frame image acquisition section adapted to acquire a plurality of consecutive frame images included in a moving image displayed on a screen, and a matching process section adapted to perform, for each of the plurality of acquired frame images, a matching process of detecting an area that matches a template image representing appearance of a display element to be detected. An area in which the display element is being displayed on the screen is identified on the basis of a result of performing the matching process on the plurality of frame images.

According to another embodiment of the present disclosure, there is provided an information processing method including acquiring a plurality of consecutive frame images included in a moving image displayed on a screen, and performing, for each of the plurality of acquired frame images, a matching process of detecting an area that matches a template image representing appearance of a display element to be detected. An area in which the display element is being displayed on the screen is identified on the basis of a result of performing the matching process on the plurality of frame images.

According to still another embodiment of the present disclosure, there is provided a program including, by a frame image acquisition section, acquiring a plurality of consecutive frame images included in a moving image displayed on a screen, and by a matching process section, performing, for each of the plurality of acquired frame images, a matching process of detecting an area that matches a template image representing appearance of a display element to be detected. An area in which the display element is being displayed on the screen is identified on the basis of a result of performing the matching process on the plurality of frame images. This program may be provided in a manner stored in a computer-readable non-transitory information storage medium.

DETAILED DESCRIPTION OF THE PREFERRED EMBODIMENT

An embodiment of the present disclosure will be described below in detail on the basis of the attached drawings.

Figure 1:
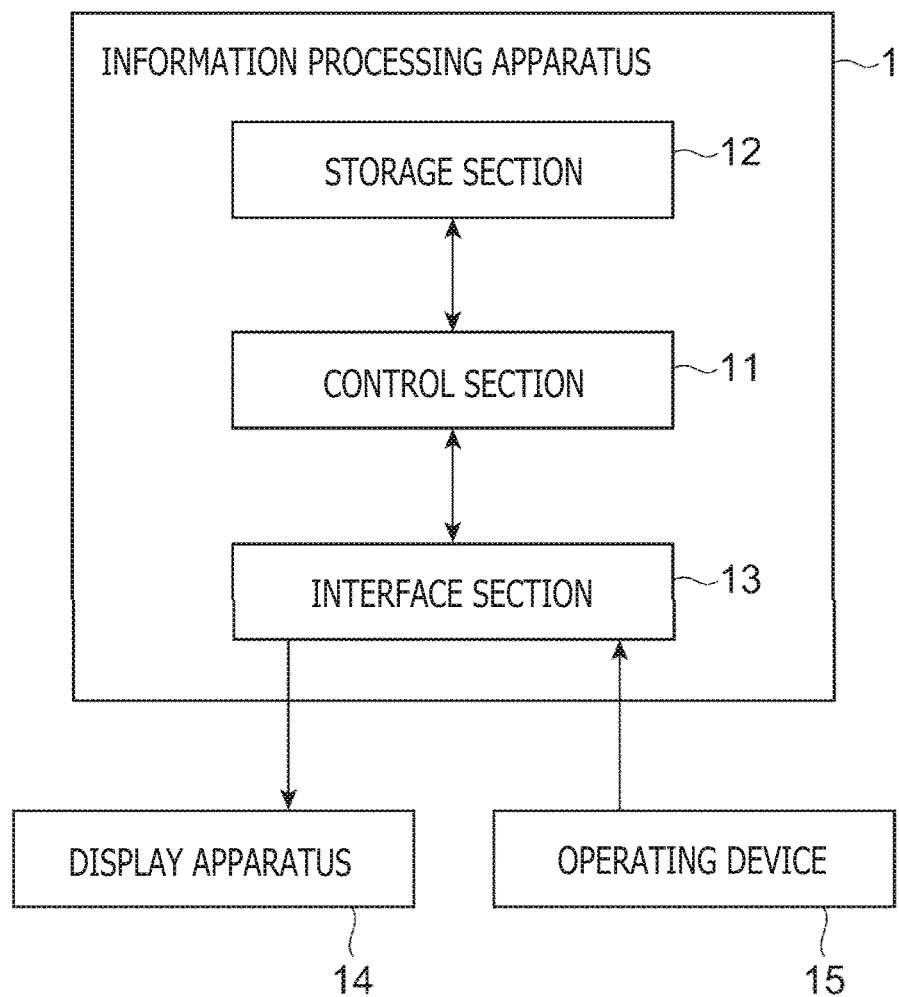
FIG. 1 is a configuration block diagram illustrating a configuration of an information processing apparatus according to an embodiment of the present disclosure.

FIG. 1 is a configuration block diagram illustrating a configuration of an information processing apparatus 1 according to an embodiment of the present disclosure. The information processing apparatus 1 is, for example, a home game console, a personal computer, a smartphone, or the like and includes a control section 11, a storage section 12, and an interface section 13 as illustrated in FIG. 1. Also, the information processing apparatus 1 is connected to a display apparatus 14 and an operating device 15.

The control section 11 includes at least a processor such as a central processing unit (CPU) and performs various kinds of information processing by executing a program stored in the storage section 12. It should be noted that specific examples of processing tasks performed by the control section 11 in the present embodiment will be described later. The storage section 12 includes at least a memory device such as a random access memory (RAM) and stores the program executed by the control section 11 and data to be processed by the program in question.

The interface section 13 is an interface to achieve data communication between the display apparatus 14 and the operating device 15. The information processing apparatus 1 is connected to the display apparatus 14 and the operating device 15 via the interface section 13 in a wired or wireless manner. Specifically, the interface section 13 includes a multimedia interface for transmitting video data, supplied from the information processing apparatus 1, to the display apparatus 14. Also, the interface section 13 includes a data communication interface such as a universal serial bus (USB) for receiving a signal indicating contents of an operation performed by a user on the operating device 15.

The display apparatus 14 is a liquid crystal display, an organic electro-luminescence (EL) display, or the like and displays an image corresponding to a video signal supplied from the information processing apparatus 1 on a screen. The operating device 15 is, for example, a keyboard, a mouse, a controller of a home game console, or the like and receives operation input from the user. It should be noted that the display apparatus 14 and the operating device 15 may be both incorporated in a housing of the information processing apparatus 1 or separate apparatuses to be connected to the information processing apparatus 1 in a wired or wireless manner. The operating device 15 may include push buttons or a touch panel disposed on a housing surface of the information processing apparatus 1.

Figure 2:
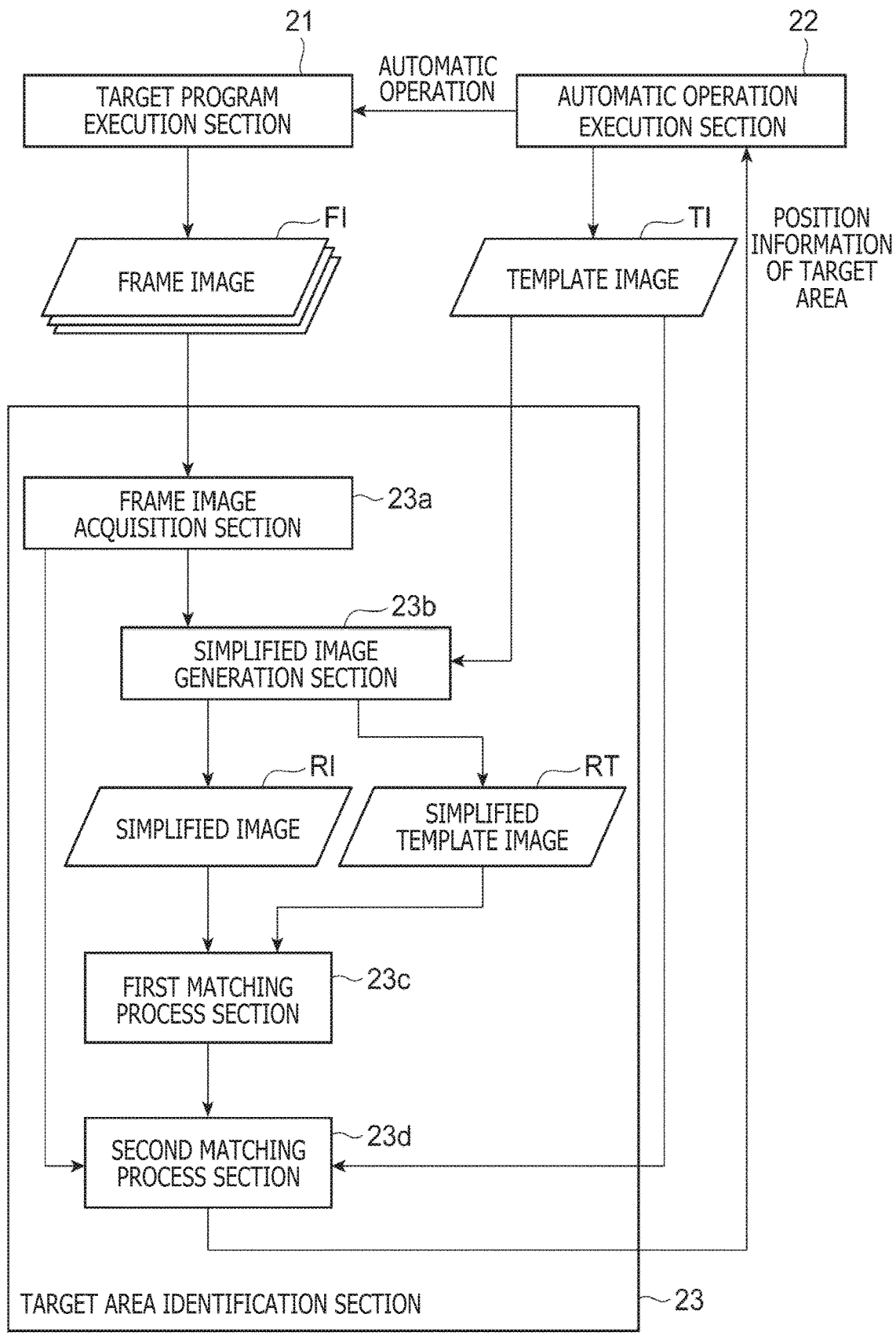
FIG. 2 is a functional block diagram illustrating functions of the information processing apparatus according to the embodiment of the present disclosure.

Functions achieved by the information processing apparatus 1 will be described below with reference to FIG. 2. As illustrated in FIG. 2, the information processing apparatus 1 functionally includes a target program execution section 21, an automatic operation execution section 22, and a target area identification section 23. Each of these functions is achieved as a result of operation of the control section 11 according to the program stored in the storage section 12. This program may be provided to the information processing apparatus 1 via a communication network such as the Internet or provided in a manner stored in a computer-readable information storage medium such as an optical disc. Also, the target area identification section 23 includes a frame image acquisition section 23a, a simplified image generation section 23b, a first matching process section 23c, and a second matching process section 23d.

The target program execution section 21 is achieved as a result of execution of a given application program by the control section 11. Hereinafter, a program to be executed by the target program execution section 21 will be referred to as a target program. This target program is subjected to automatic operation by the automatic operation execution section 22. The target program execution section 21 draws a frame image indicating a processing result of the target program every predetermined period of time and displays the frame image on the screen of the display apparatus 14. This allows the processing result of the target program to be displayed on the screen of the display apparatus 14 as a moving image that changes with time.

It should be noted that the target program may be a web app. In this case, a display image representing the processing result thereof is drawn by a web browser program and displayed on the screen of the display apparatus 14.

The automatic operation execution section 22 is realized as a result of execution of an automatic operation program which is a separate program from the target program by the control section 11. This automatic operation program automatically performs a predetermined operation (hereinafter referred to automatic operation) on the target program instead of the user. The automatic operation program may be a program for testing the target program (operational verification). In this case, the automatic operation program performs automatic operation on the target program and verifies whether or not the target program runs as anticipated by verifying contents output by the target program as a result of the automatic operation.

Specifically, the automatic operation execution section 22 performs automatic operation on the target program according to operation definition data defined in advance. Operation definition data defines which automatic operation to perform under which circumstance and includes contents of automatic operations such as click operation, tap operation, and key input and information identifying a target subjected to automatic operation. The operation definition data may be prepared by the user in advance and stored in the storage section 12.

Figure 3:
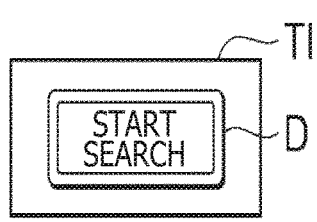
FIG. 3 is a diagram illustrating an example of details of operation definition data.

Particularly in the present embodiment, operation definition data includes definitions of automatic operations for making a predetermined operation input to a predetermined display element D that is assumed to be displayed on the screen of the display apparatus 14 by the target program. The automatic operation in this case is an operation of pointing to a position on the screen such as click operation or tap operation, and the display element D includes an object to be operated, such as an operating button or an icon. It should be noted that the display element D may include not only an object to be operated but also various kinds of elements to be detected by the target area identification section 23 described later, such as labels disposed around the object. Further, operation definition data includes a template image TI representing appearance of the display element D as information identifying a target subjected to automatic operation. FIG. 3 illustrates an example of operation definition data including the template image TI as described above.

Here, a position where the display element D is displayed on the screen is likely to vary depending on data items to be displayed by the target program and display settings such as font size. Also, in a case where information being displayed on the screen can be scrolled, for example, a display position of the display element D is likely to be changed also depending on operation of the user. Accordingly, in the present embodiment, the target area identification section 23 identifies an area subjected to automatic operation (target area) in response to a request from the automatic operation execution section 22. This target area is an area to be determined that the display element D is being displayed. The automatic operation execution section 22 specifies a target area identified by the target area identification section 23 and performs automatic operation such as click operation defined by operation definition data. This makes it possible for the automatic operation execution section 22 to automatically perform an operation such as pressing down an operating button displayed on the screen or selecting a specific menu item.

Further, the appearance of the display element D changes with time in some cases. For example, an animation may be displayed; for example, whole or part of the display element D flashes or rotates and an effect is displayed in a superimposed manner. In such a case, the template image TI, a still image, is likely to disagree with the appearance of the display element D included in the display image displayed by the target program at a certain moment. Accordingly, in the present embodiment, the target area identification section 23 performs a matching process using the template image TI on each of a plurality of frame images FI displayed consecutively in terms of time as will be described later, thus detecting a target area.

It should be noted that the target area identification section 23 is achieved by a program separate from the target program. This program may be part of the automatic operation program achieving the automatic operation execution section 22 or a program separate therefrom. In any case, the automatic operation execution section 22 and the target area identification section 23 are realized by a program or programs separate from the target program, and these sections perform automatic operation by analyzing the display image displayed on the screen of the display apparatus 14 by the target program. This eliminates the need for the target program itself to include functions required for automatic operation thus allowing automatic operation to be performed without modifying the target program that is designed to run with normal user operation.

Contents of the process of identifying a target area subjected to automatic operation by the target area identification section 23 will be described in detail below.

The frame image acquisition section 23a acquires image data of a display image displayed on the screen of the display apparatus 14 by the target program. The display image displayed by the target program is a moving image updated at a predetermined frame rate as described above. Accordingly, the frame image acquisition section 23a acquires, in sequence, the plurality of frame images FI, consecutive in terms of time, included in this moving image.

It should be noted that the frame image acquisition section 23a may continue with the acquisition of the frame images FI until the identification of the target area described later is completed. Alternatively, the frame image acquisition section 23a may acquire the predetermined number of frame images FI and terminate the process of identifying the target area after the acquisition of the predetermined number of frame images FI.

The target area identification section 23 performs, for each of the plurality of frame images FI acquired by the frame image acquisition section 23a, a matching process of detecting an area that matches the template image TI. Then, in a case where an area matching the template image TI is detected from any of the plurality of frame images FI, the area is identified as a target area in which the display element D is included. Here, the matching process is a process of identifying an area analogous to the template image TI to an extent comparable to or exceeding a given requirement, and in this process, the image in the target area need not perfectly match the template image TI.

This matching process is achieved by the simplified image generation section 23b, the first matching process section 23c, and the second matching process section 23d. By performing the matching process for each of the plurality of frame images FI in this manner, the target area identification section 23 can identify an area in which the time-varying display element D is displayed from the moving image displayed by the target program.

The simplified image generation section 23b generates, by using each of the plurality of frame images FI acquired by the frame image acquisition section 23a as an original image, a simplified image RI obtained by simplifying the original image in question. The simplified image RI may be a scaled-down image obtained by scaling down the original image. Also, the simplified image RI may be an image with color information reduced, for example, by transforming the original image into a gray scale image. Further, the simplified image RI may be an image obtained by not only scaling down the original image but also reducing its color information. In any case, the simplified image RI has a smaller amount of data than the original image, allowing the matching process, described later, to be performed faster than with the original image. It should be noted that the simplified image generation section 23b also performs, also for the template images TI supplied from the automatic operation execution section 22, image processing similar to transformation of the original image into the simplified image RI, thus generating the simplified template image RT.

The first matching process section 23c performs a first matching process on the simplified image RI generated by the simplified image generation section 23b. This first matching process is a process of detecting an area matching the template image TI in the simplified image RI. The first matching process section 23c conducts the matching process with the simplified image RI by using the simplified template image RT described above. The simplified image RI has a smaller amount of data, thereby making it possible to conduct the first matching process faster than in a case where the matching process is performed on the original image.

The first matching process section 23c may perform the matching process with a known algorithm. Specifically, the first matching process section 23c repeats, for part of a testing area in the simplified image RI, a process of evaluating a degree of match between a partial image in the testing area and the simplified template image RT while, at the same time, moving the testing area. Then, the first matching process section 23c identifies the partial area whose degree of match with the simplified template image RT is equal to or greater than a predetermined threshold as a candidate area which serves as a candidate for a target area. It should be noted that the first matching process section 23c may identify a plurality of partial areas from the single simplified image RI as the candidate area.

The second matching process section 23d performs, for an area in the original image corresponding to the candidate area detected by the first matching process section 23c, a second matching process of evaluating a degree of match with the template image TI. This second matching process is a process of evaluating whether the candidate area truly matches the template image TI, making it possible to evaluate the degree of match with higher accuracy than in the first matching process by matching using the non-simplified frame image FI (original image) and the template image TI. Also, the second matching process is performed only on the candidate area, thus contributing to a reduced amount of time required as compared to a similar matching process for the entire frame image FI.

The second matching process section 23d identifies a target area in which the display element D is displayed on the basis of the result of the second matching process and notifies the automatic operation execution section 22 of information indicating a position of the identified target area in the frame image. For example, the second matching process section 23d identifies a candidate area evaluated to match the template image TI with a degree of match equal to or greater than a predetermined threshold as a target area.

It should be noted that the second matching process section 23d need not identify a target area for each of all of the plurality of frame images FI and may determine that, as long as a target area can be identified from at least one frame image FI, the display element D is being displayed at the position of that target area. As described earlier, in the case where the appearance of the display element D changes with time, there is a likelihood that an area matching the template image TI may be included in only some of the plurality of frame images FI acquired by the frame image acquisition section 23a and may not be included in other frame images FI. Accordingly, as long as an area that matches the template image TI with a degree of match equal to or greater than the predetermined threshold is detected from the single frame image FI, the second matching process section 23d may identify that area as a target area. Alternatively, in a case where, of the plurality of frame images FI, the number of frame images FI to be determined that a target area is present at the same position reaches or surpasses a predetermined count or a predetermined ratio, the second matching process section 23d may identify that position as a target area in which the display element D is included and notify the automatic operation execution section 22.

In this manner, by subjecting the plurality of consecutive frame images FI to the matching processes and identifying, as a target area in which the display element D is included, an area matching the template image TI in only some of the frame images FI if such an area is identified, it is possible to demand a high requirement as an evaluation requirement for the degree of match in the matching processes, thus providing a reduced likelihood of erroneous detection.

It should be noted that the frame image acquisition section 23a may change the number of frame images FI to be acquired in order to identify a target area depending on the type of the display element D to be detected. For example, in a case where the appearance of the display element D to be detected changes repeatedly at a predetermined cycle (repetition interval), and if the matching processes are performed on a cycle's worth of frame images FI, there is a prospect that, among these frame images FI, one or more frame images FI that include an area that matches the template image TI with a high degree of match are present. Accordingly, it is only sufficient that the frame image acquisition section 23a acquires the number of frame images FI determined depending on the repetition interval.

Specifically, the number of frame images to be acquired by the frame image acquisition section 23a may be specified by the automatic operation execution section 22. In the example of FIG. 3, the number of frame images to be acquired is specified in association with the contents of the automatic operation and the template image TI. It is assumed here that the screen of the display apparatus 14 is updated at a frame rate of 60 fps and that the display element D is animated repeatedly at a one-second cycle. Therefore, the number of frame images per second, 60, is associated with this automatic operation as the number of frame images to be acquired. For example, in a case where another display element D changes repeatedly at a 1.5-second cycle, the number of frame images, 90, is associated with that display element D in operation definition data.

It should be noted that, although the number of frame images to be acquired is associated with each of the plurality of types of display elements D to be detected here, a repetition interval of the display element D may be association with the display element D to be detected to be stored therein. In this case, the frame image acquisition section 23a calculates the number of frame images to be acquired by using a length of the repetition interval associated with the display element D to be detected and the frame rate.

Also, in a case where a plurality of types of target programs are subjected to automatic operation by the automatic operation execution section 22, the number of frame images to be acquired may be determined in advance for each target program type and not for each display element D to be detected. In this case, it is only sufficient that the automatic operation execution section 22 specifies, to the target area identification section 23, the number of frame images to be acquired depending on the target program type subjected to automatic operation.

Figure 4:
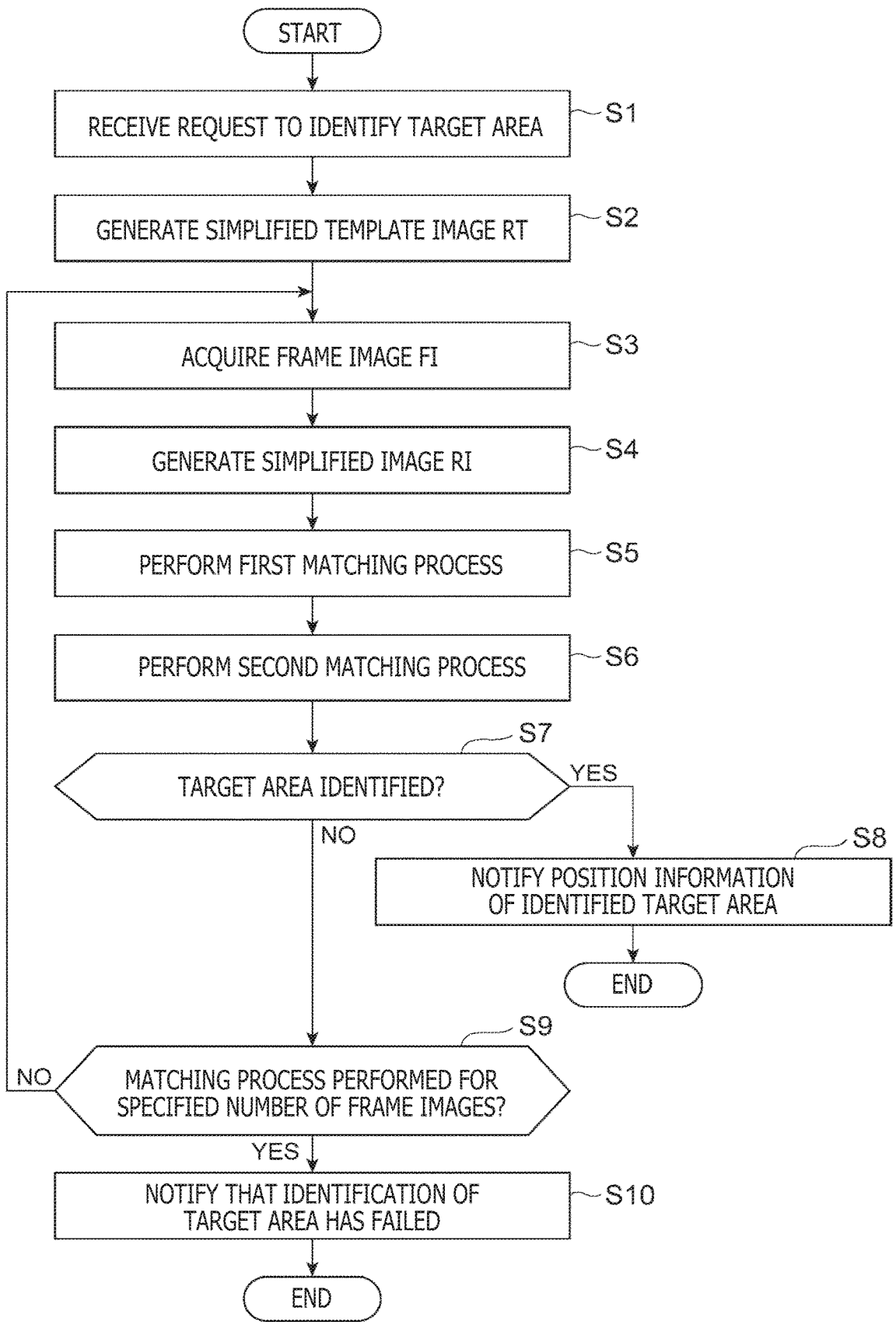
FIG. 4 is a flowchart illustrating an example of a processing flow handled by the information processing apparatus according to the embodiment of the present disclosure.

An example of a processing flow executed by the target area identification section 23 in the present embodiment will be described with reference to the flowchart of FIG. 4.

When time comes to perform automatic operation while the target program is executed, the automatic operation execution section 22 reads out, from the operation definition data, the template image TI representing the appearance of the display item D subjected to automatic operation to be performed and the number of frame images to be acquired, requesting the target area identification section 23 to identify a target area. When this request to identify a target area is received (S1), the target area identification section 23 generates the simplified template image RT first on the basis of the template image TI specified in S1 (S2).

Thereafter, the frame image acquisition section 23a acquires the frame image FI being displayed on the display apparatus 14 at that moment (S3). When the frame image FI is acquired by the frame image acquisition section 23a, the simplified image generation section 23b generates the simplified image RI, for example, by reducing the frame image FI acquired in S3 (S4).

Next, the first matching process section 23c performs the first matching process by using the simplified image RI generated in S4 and the simplified template image RT generated in S2 (S5). Next, the second matching process section 23d performs, for the candidate area identified in S5, the second matching process of evaluating the degree of match between an image in the candidate area in the frame image FI acquired in S3 and the template image TI specified in S1 (S6).

When the second matching process in S6 is over, the target area identification section 23 determines whether or not a target area has been identified by this second matching process (S7). Specifically, in a case where a candidate area evaluated to match the template image TI with a degree of match equal to or greater than a predetermined threshold is detected by the second matching process, the target area identification section 23 identifies the candidate area detected at that moment as a target area. In this case, the target area identification section 23 notifies the automatic operation execution section 22 of information indicating a position of the identified target area (S8). This terminates the matching processes by the target area identification section 23, and the automatic operation execution section 22 performs a predetermined automatic operation (click operation) on the notified position.

Meanwhile, in a case where it is determined that no target area has been identified in S7, the target area identification section 23 determines whether the matching processes are performed on the number of frame images FI specified in S1 (S9). In a case where the matching processes have been already performed on all the frame images FI following the acquisition of the specified number of frame images FI by the frame image acquisition section 23a, the target area identification section 23 determines that the identification of a target area including the specified display element D has failed, notifying the automatic operation execution section 22 to that determination and terminating the processes (S10). After a notification that the identification of a target area has failed, the automatic operation execution section 22 performs predetermined error processes such as suspending the automatic operation by outputting a predetermined error message or attempting different automatic operation, for example.

In a case where it is determined in S9 that the matching processes have yet to be completed on the specified number of frame images FI, the target area identification section 23 returns to S3 and performs the matching processes described so far on the new frame image FI that is displayed on the screen of the display apparatus 14 next. As a result, the target area identification section 23 repeats the matching processes on the frame images FI that are sequentially displayed one after another until a target area including the display element D is identified or the matching processes are completed on the specified number of frame images FI. Accordingly, it is possible to identify the target area in which the display element D to be detected is displayed from the moving image that changes while the specified number of frame images FI is displayed.

As described above, according to the information processing apparatus 1 according to the present embodiment, it is possible to detect the display element D that changes with time with high accuracy from a display image displayed by a target program. Accordingly, it is possible to perform automatic operation on the target program without modifying the target program.

It should be noted that embodiments of the present disclosure are not limited to that described above. For example, the matching process flow described above is merely an example, and a target area may be identified from the plurality of frame images FI in a different procedure.

Also, in the above description, the template image TI representing the appearance of the display item D to be detected and the number of frame images to be acquired to detect the display element D in question are recorded in advance in operation definition data. However, the present disclosure is not limited thereto, and the simplified template image RT may be recorded in advance in the operation definition data together with the template image TI. Also, information specifying an area in the frame image FI subjected to the matching processes may also be included in the operation definition data. For example, in a case where it is assumed that the display element D to be detected is displayed in only a partial area in the frame image FI, it is possible to reduce processing burdens and time required for the matching processes by subjecting only that partial area to the matching processes. Accordingly, information specifying, for each of the plurality of types of display elements D to be detected, an area in which the display element D is assumed to be displayed may be defined in advance and specified to the target area identification section 23 at the time of identification of a target area.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a frame image acquisition section adapted to acquire a plurality of consecutive frame images included in a moving image displayed on a screen; and
a matching process section adapted to perform, for each of the plurality of acquired frame images, a matching process of detecting an area that matches a template image representing appearance of a display element to be detected, wherein:
an area in which the display element is being displayed on the screen is identified on a basis of a result of performing the matching process on the plurality of frame images,
the matching process section detects any of a plurality of types of display elements, and
the frame image acquisition section acquires the number of consecutive frame images determined depending on the display element to be detected of the plurality of types of display elements for the matching process for detecting the display element in question to be detected.

2. The information processing apparatus according to claim 1, wherein the matching process section further includes
a simplified image generation section adapted to generate, by using each of the plurality of acquired frame images as an original image, a simplified image obtained by simplifying the original image in question,
a first matching process section adapted to perform a first matching process of detecting an area matching the template image from the generated simplified image, and
a second matching process section adapted to perform, for an area in the original image corresponding to the area in the simplified image detected by the first matching process, a second matching process of evaluating a degree of match with the template image, wherein
an area in which the display element is being displayed on the screen is identified on a basis of a result of performing the second matching process.

3. An information processing method comprising:
acquiring a plurality of consecutive frame images included in a moving image displayed on a screen; and
performing, for each of the plurality of acquired frame images, a matching process of detecting an area that matches a template image representing appearance of a display element to be detected, wherein:
an area in which the display element is being displayed on the screen is identified on a basis of a result of performing the matching process on the plurality of frame images,
the matching process detects any of a plurality of types of display elements, and
the acquiring acquires the number of consecutive frame images determined depending on the display element to be detected of the plurality of types of display elements for the matching process for detecting the display element in question to be detected.

4. A non-transitory, computer readable storage medium containing a program, which when executed by a computer, causes the computer to perform an information processing method by carrying out actions, comprising:
acquiring a plurality of consecutive frame images included in a moving image displayed on a screen; and
performing, for each of the plurality of acquired frame images, a matching process of detecting an area that matches a template image representing appearance of a display element to be detected, wherein:
an area in which the display element is being displayed on the screen is identified on a basis of a result of performing the matching process on the plurality of frame images,
the matching process detects any of a plurality of types of display elements, and
the acquiring acquires the number of consecutive frame images determined depending on the display element to be detected of the plurality of types of display elements for the matching process for detecting the display element in question to be detected.

* * * * *